United States Patent [19]
Wolanin et al.

[11] Patent Number: 5,711,162
[45] Date of Patent: Jan. 27, 1998

[54] REFRIGERATOR COMPRESSOR MOUNTING PAN ARRANGEMENT

[75] Inventors: Gerald L. Wolanin, Galesburg; Douglas A. Heims, Knoxville, both of Ill.

[73] Assignee: Maytag Corporation, Newton, Iowa

[21] Appl. No.: 629,738

[22] Filed: Apr. 9, 1996

[51] Int. Cl.[6] ............... F25D 23/00; F25D 19/00; B23P 11/00; A47B 88/00
[52] U.S. Cl. ............... 62/302; 62/298; 29/898.07; 29/513; 312/351.11
[58] Field of Search ............... 62/298, 297, 295, 62/285, 302, 303, 440, 441; 29/890.035, 428, DIG. 11, DIG. 37, 434, 437, 438, 898.07, 513, 895, 895.2, 895.213, 898; 16/40, 31 R; 312/116, 401, 408, 237, 249.1, 249.9, 351.11

[56] References Cited

U.S. PATENT DOCUMENTS

| | | |
|---|---|---|
| 252,078 | 1/1882 | Cowell . |
| 2,186,724 | 1/1940 | Harris . |
| 3,023,487 | 3/1962 | Hinckley ............... 29/438 |
| 3,204,285 | 9/1965 | Butsch . |
| 3,230,733 | 1/1966 | Rutishauer et al. ............... 62/302 |
| 4,156,352 | 5/1979 | Gelbard et al. ............... 62/285 |
| 4,192,564 | 3/1980 | Losert ............... 312/351.11 |
| 4,539,737 | 9/1985 | Kerpers et al. ............... 62/302 X |
| 4,748,715 | 6/1988 | Rice ............... 16/40 X |
| 4,783,879 | 11/1988 | Weaver ............... 312/351.11 X |
| 4,920,696 | 5/1990 | Mawby et al. ............... 312/404 |

Primary Examiner—William Doerrler
Attorney, Agent, or Firm—Everett G. Diederiks, Jr.

[57] ABSTRACT

A refrigerator compressor mounting pan arrangement is preferably formed out of a metal plate which is drawn to form a pair of laterally spaced wheel wells that project upwardly from an upper surface of the plate. On the lower surface of the plate, on opposing side of each wheel well, are recessed pocket portions which define enlarged areas against which wheel axles can bear. A plurality of spaced tabs are lanced out of the plate adjacent each pocket such that, when a wheel having an associated axle is positioned in the well the axle bearing against the pockets, the tabs may be readily bent about the axle to retain the axle in a desired load bearing position. A plurality of additional tabs are lanced out of the plate and project upwardly from the upper surface of the plate in order to enable a compressor and a condenser to be readily secured atop the plate.

16 Claims, 5 Drawing Sheets

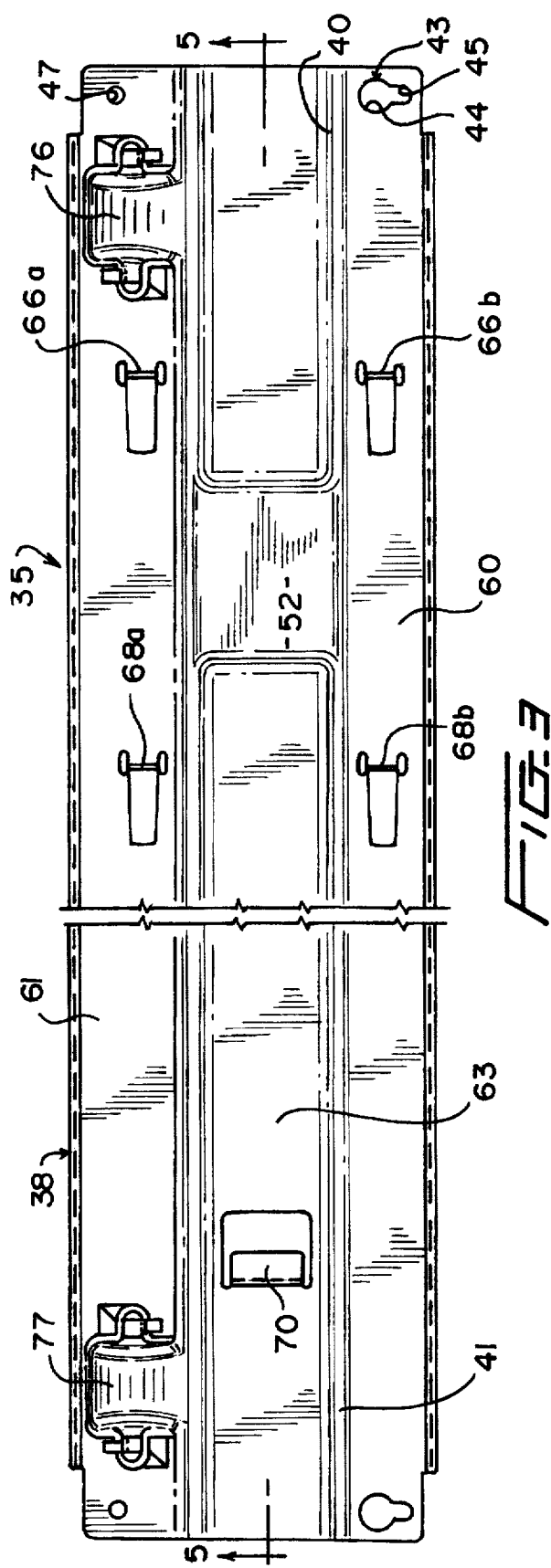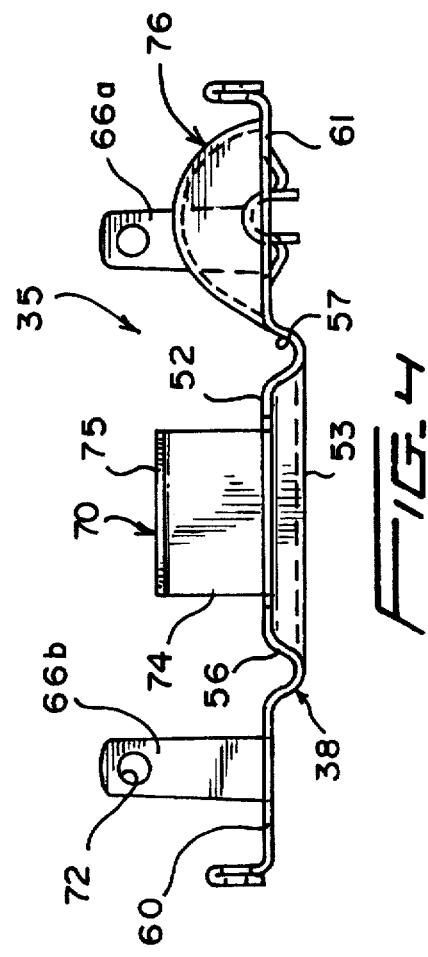

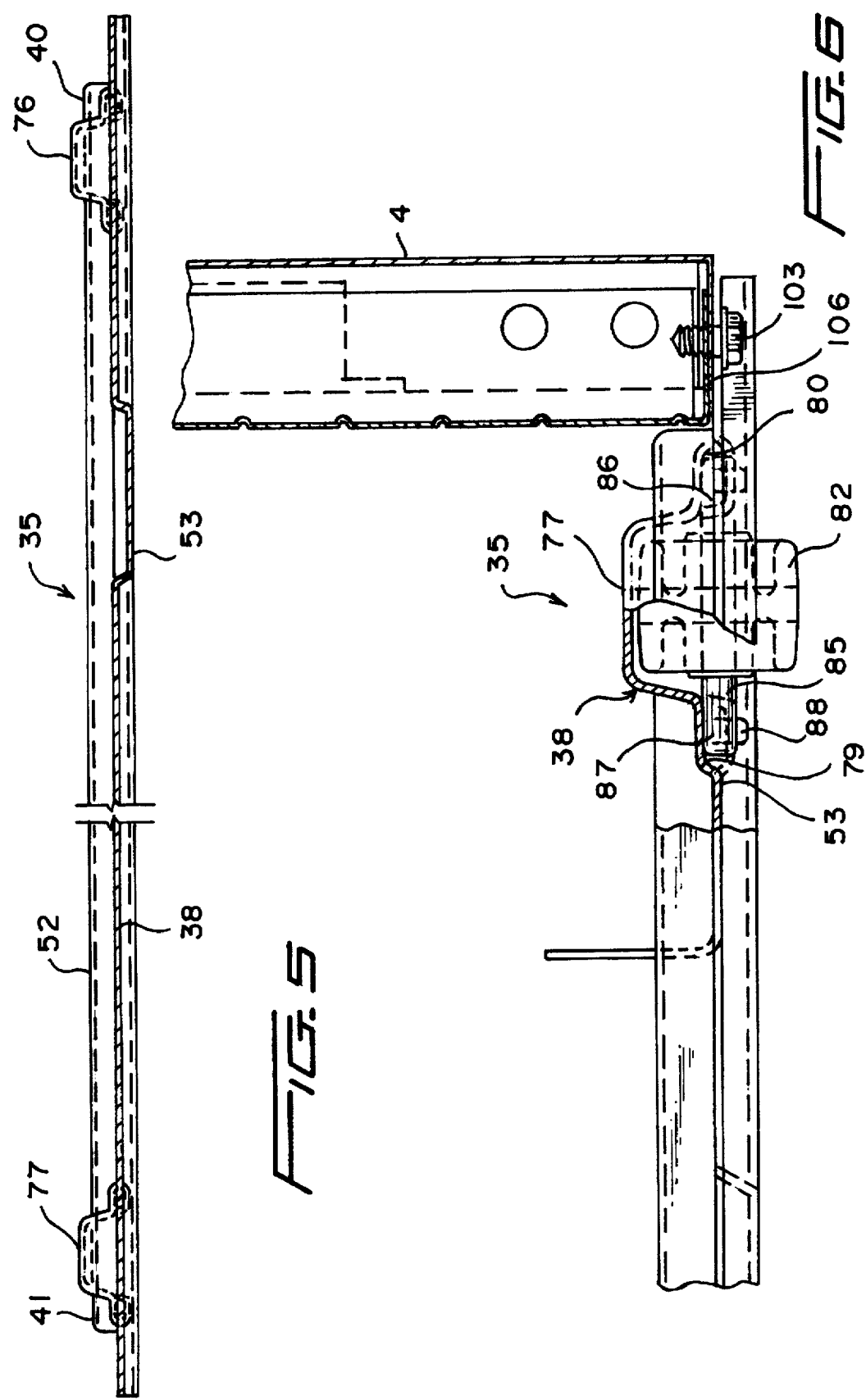

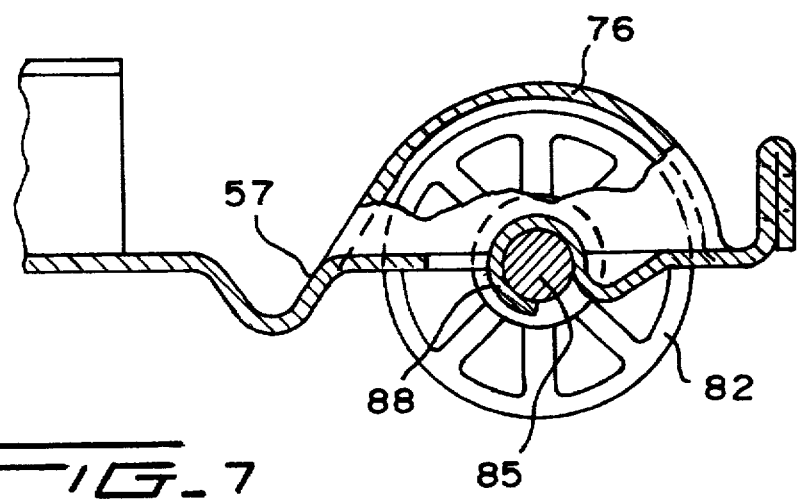
FIG_7
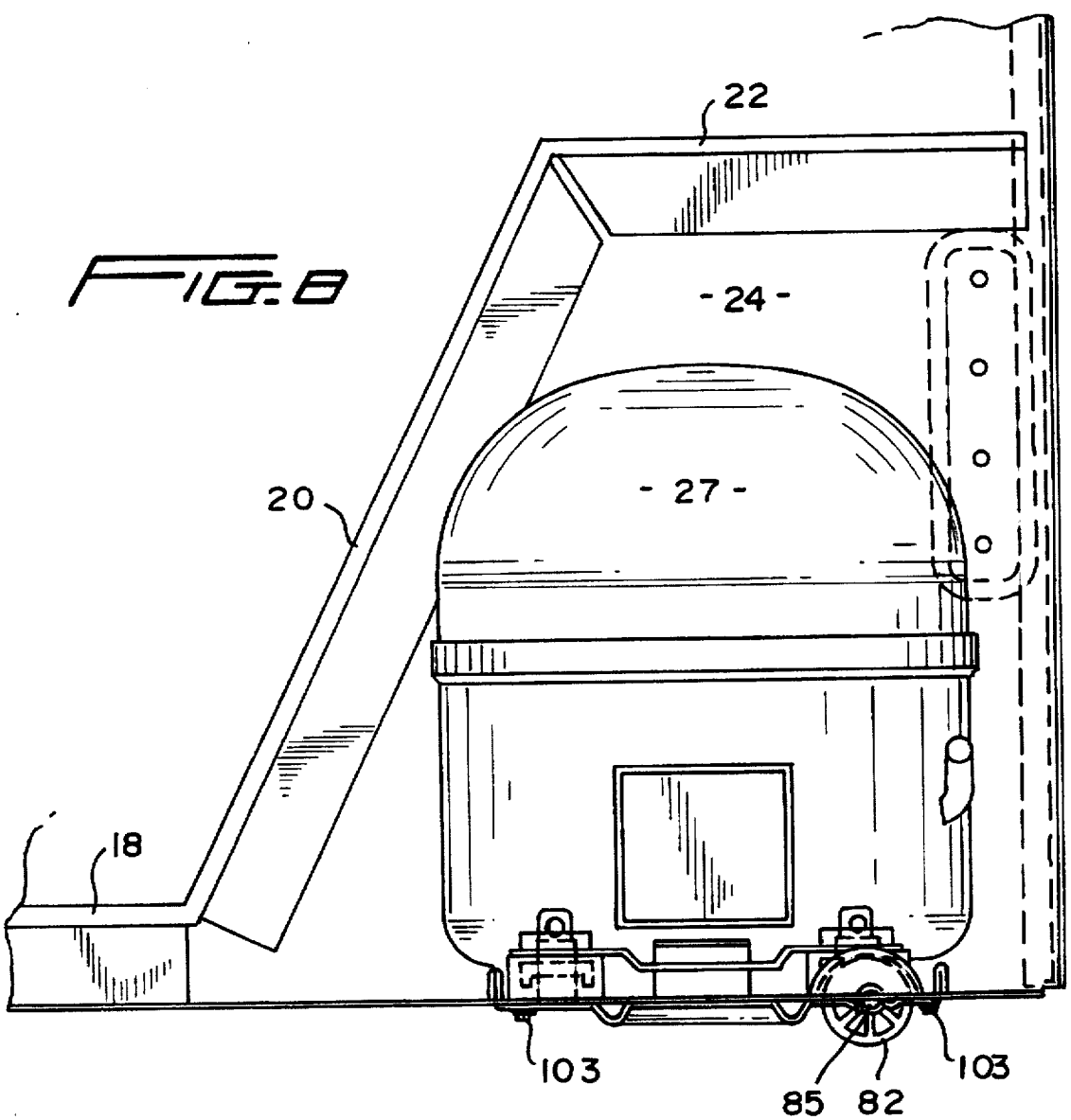
FIG_8

5,711,162

REFRIGERATOR COMPRESSOR MOUNTING PAN ARRANGEMENT

BACKGROUND OF THE INVENTION

1. Field of the Invention

The present invention pertains to the art of refrigerators and, more particularly, to a compressor mounting pan arrangement for use in a refrigerator.

2. Description of Related Art

Most large refrigerators, particularly those sold for common household use, are supported upon wheels to enable the refrigerator to be easily maneuvered. In addition, it is commonplace to provide a storage area or chamber at the lower rear portion of the refrigerator for mounting of various components needed for the refrigeration circuit. More specifically, it is heretofore known to mount the larger components of a refrigeration circuit such as a compressor and a condenser on a pan which is attached to the outer shell of the refrigerator and which functions as a base for the storage chamber. The wheels which support the rear of the refrigerator are often mounted to the pan.

Generally, past arrangements include a pair of spaced brackets extend downward from the pan for supporting each wheel. The brackets are provided with aligned through holes such that a wheel, having an associated axle, can be positioned between the brackets with the axle extending through the through holes. A corresponding set of brackets are provided at a spaced lateral location for another rear wheel. With such an arrangement, the axle of each of the wheels bears against an area defined by the thickness of each of the brackets. Since the brackets are generally formed of metal plates, this bearing surface area is quite small. When the interior of a refrigerator is loaded, a substantial force acts between these brackets and axles which, over time, tends to cause the brackets to flex outwardly or to otherwise be deformed. Additionally, if the refrigerator is subjected to any side loads, such as movement of the unit sideways during installation, servicing, or cleaning, these brackets are easily bent or deformed to a point where they are no longer supporting the wheels, axles or the refrigerator load. In this condition the attached wheels are canted to a point that any further movement of the refrigerator causes damage to the supporting floor surface of the kitchen or wherever being used.

Since the wheel supporting arrangement in a refrigerator should generally not be considered a repair concern, there exists a need in the art for a more efficient and effective wheel mounting arrangement for use in connection with a refrigerator compressor mounting pan. In addition, there is a need for a refrigerator compressor mounting pan arrangement which is cost effective to produce and to which can be readily attached at least the larger components of a refrigeration circuit.

SUMMARY OF THE INVENTION

The invention pertains to a refrigerator compressor mounting pan arrangement which is preferably formed out of a metal plate. The plate is drawn to form a pair of laterally spaced wheel wells which project upwardly from an upper surface of the plate. On the lower surface of the plate, on opposing sides of each wheel well, are recessed pocket portions which define enlarged areas against which wheel axles can bear. A plurality of spaced tabs are lanced out of the plate adjacent each pocket such that when a wheel having an associated axle is positioned in the well such that the axle bears against the pockets the tabs may be readily bent about the axle to retain the axle in a desired load bearing position. A plurality of additional tabs are lanced out of the plate and project upwardly from the upper surface of the plate in order to enable a compressor and a condenser to be readily secured atop the plate.

Additional features and objects of the present invention will become more readily apparent from the following description of a preferred embodiment thereof when taken in conjunction with the drawings wherein like reference numerals refer to corresponding parts in the several views.

BRIEF DESCRIPTION OF THE DRAWINGS

FIG. 3 is a top view of the compressor mounting pan arrangement of the present invention.

FIG. 4 is an end view of the compressor mounting pan arrangement.

FIG. 5 is a cross-sectional view generally taken along line V—V in FIG. 3.

FIG. 6 is an enlarged view of a lower rear corner portion of a refrigerator cabinet illustrating the attachment of the compressor mounting pan arrangement thereto.

FIG. 7 is a partial end view of the compressor mounting pan arrangement.

FIG. 8 is an enlarged view of a rear end portion of the refrigerator cabinet shown in FIG. 1 illustrating the compressor mounting pan arrangement in more detail.

DETAILED DESCRIPTION OF THE PREFERRED EMBODIMENT

Figure 1:
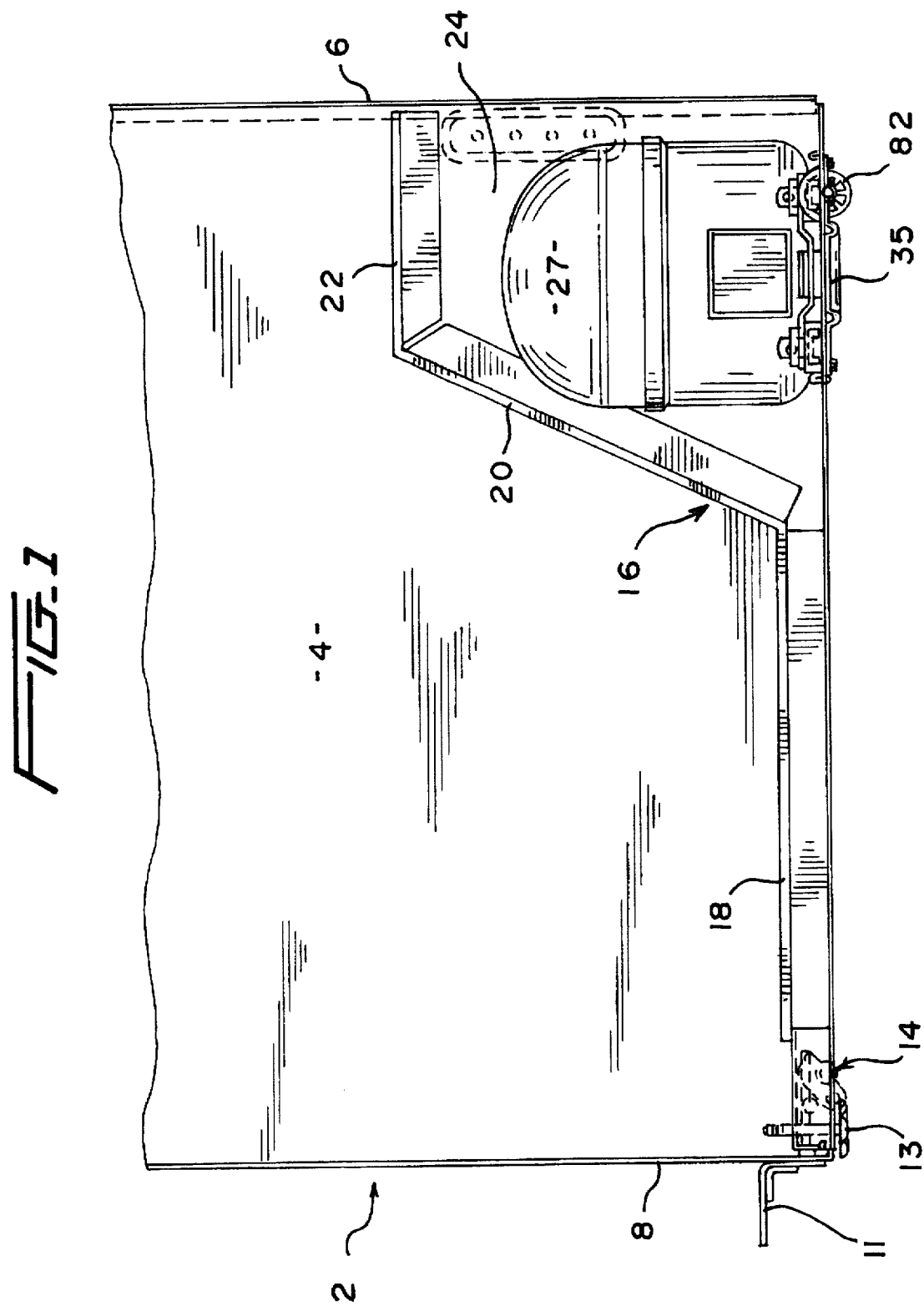
FIG. 1 is a partial open side view of a lower portion of a refrigerator cabinet incorporating the compressor mounting pan arrangement of the present invention.
Figure 2:
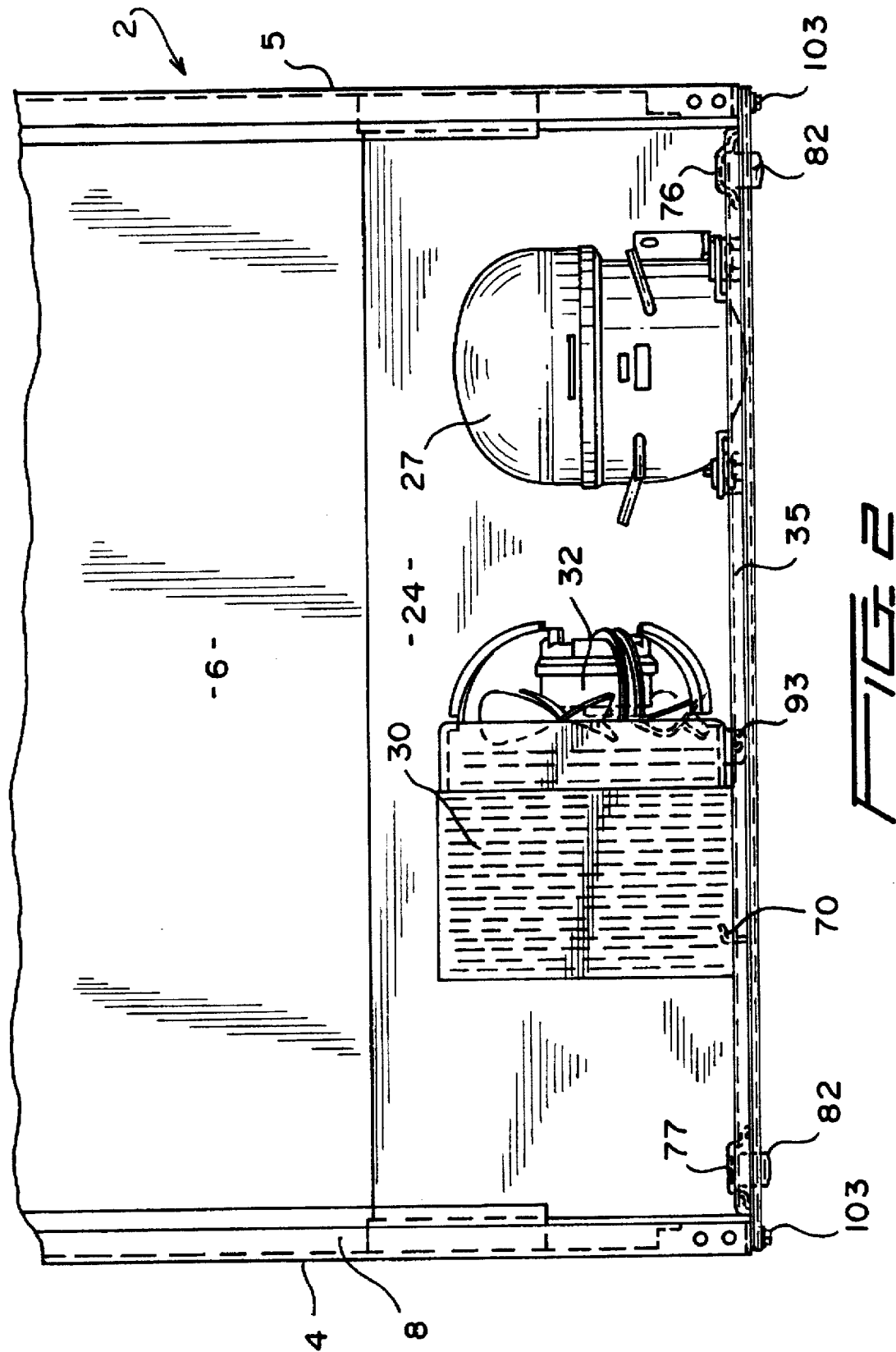
FIG. 2 is a partial front view of the lower portion of the refrigerator cabinet of FIG. 1.

With initial reference to FIGS. 1 and 2, a refrigerator cabinet is generally indicated at 2 and includes opposed side panels 4, 5 and a top panel (not shown) which are generally formed from bending a single sheet of metal to which a rear panel 6 is attached. Side panels 4 and 5 terminate at a forward end in front in-turned flanges 8, one of which is shown to have mounted thereto a pivot mounting bracket 11 for mounting a refrigerator door (not shown) to cabinet 2. As best shown in FIG. 1, the lower front portion of a refrigerator cabinet 2 can have vertically adjustable legs 13, as well as retractable wheel mechanisms 14 at this location. The refrigerator cabinet 2 can comprise a side-by-side refrigerator or a refrigerator having an upper freezer portion and a lower refrigerator portion. In any event, as shown in these drawings, the refrigerator cabinet has mounted therein a bottom panel unit 16 that includes a first horizontal portion 18, a rearwardly sloping portion 20 and a second horizontal portion 22. At the lower rear end of the refrigerator cabinet, the bottom panel unit 16 and cabinet 2 define a chamber 24. Mounted within chamber 24 is a compressor 27, a condenser 30 and fan unit 32 which is attached to the condenser 30. As illustrated in these figures, compressor 27, condenser 30 and fan unit 32 are mounted upon a wheeled pan 35, the specific structure of which will be detailed below.

With reference to FIGS. 3–5, pan 35 is generally comprised by a plate 38 having first and second longitudinally spaced ends 40, 41. Each end 40, 41 is preferably formed with a forward aperture 43 that takes the form of a slot having an enlarged open portion 44 and a reduced diameter opening portion 45. In addition, at rearward portions of ends 40 and 41 are provided respective rear apertures 47. As will be more fully discussed below, apertures 43 and 47 are utilized to mount pan 35 to refrigerator cabinet 2.

Plate 38 includes an upper surface 52 and a lower surface 53. In a preferred embodiment, plate 38 is drawn with a pair of longitudinally extending trough portions 56 and 57 which aid in adding structural rigidity to the plate such that plate 38 advantageously resists bending. The presence of troughs 56 and 57 basically separate upper surface 52 to front and rear strips 60 and 61 that are spaced by a central strip 63.

Spaced from first longitudinal end 40 and lanced out of front and rear strips 60 and 61 respectively are a first set of brackets 66a and 66b. Spaced longitudinally from the first set of brackets 66a, 66b is a second set of brackets 68a, 68b which are also preferably lanced out of front and rear strip 60 and 61 respectively. Finally, a third bracket 70 is formed out of a portion of central strip 63 and is spaced from both second brackets 68a, 68b and second end 41 of pan 35. As best shown in FIG. 4, each of the first and second sets of brackets 66a, 66b, 68a and 68b are provided with respective holes 72 which open in the longitudinal direction of pan 35. Third bracket 70 actually is formed from an upstanding portion 74 and an angled terminal end 75. As will be more fully described below, brackets 66a, 66b and 68a, 68b, as well as third bracket 70, enable compressor 27, condenser 30 and fan 32 to be readily attached to pan 35.

Pan 35 is also formed with a pair of wheel wells 76, 77. In the preferred embodiment, wheel wells 76 and 77 are drawn out of plate 38 within rear strip 61. With this arrangement, each wheel well 76, 77 defines a convexed member extending up from upper surface 52 as best seen in FIG. 4. As shown in FIGS. 4 and 5 and perhaps better illustrated in FIGS. 6 and 7, lower surface 53 of plate 38 is formed with recessed portions 79 and 80 which are positioned on opposing longitudinal sides of each wheel well 76, 77. In the preferred embodiment, recessed portions 79 and 80 are also formed by drawing plate 38. For the reasons which will become more fully apparent below, recessed portions 79 and 80 define bearing surfaces. Positioned within each wheel well 76, 77 is a respective wheel 82. Each wheel 82 is rotatably mounted upon an axle 85 which has respective ends 86, 87 which bear against recessed portions 79 and 80. Tabs 88 are lanced out of plate 38 at each recessed portion 79, 80 such that once an axle 85 is positioned against respective recessed portions 79, 80, respective tabs 88 can be bent about axle 85 in the manner best illustrated in FIGS. 6 and 7 to retain axle 85 against the respective bearing surfaces defined by the recessed portion 79, 80. As clearly shown in FIG. 7, each axle 85 is in contact with a substantial surface portion of plate 38 and is retained in this engaged position by the use of tabs 88. Due to this enlarged bearing surface area, forces acting between each axle 85 and plate 38 are distributed over a substantially enlarged area as compared to the known prior art. In addition, since the bearing surfaces are defined by the recessed portions 79 and 80, each axle 85 is generally inhibited from longitudinal movement relative to plate 38.

In accordance with the invention, compressor 27 can be readily positioned between brackets 66A, 66B, 68A and 68B and respective mechanical fasteners can be inserted through holes 72 and respective brackets (not shown in detail) carried by compressor 27 to mount compressor 27 on pan 35. In addition, fan unit 32 can be interengaged with condenser 30 in a known manner and this assembled unit can be attached to pan 35 by slipping a portion of condenser 30 under third bracket 70 and securing an opposing longitudinal end portion of the assembled unit to plate 38 by means of auxiliary tabs 93 (see FIG. 2) carried by fan unit 32 through respective mechanical fasteners (not shown). Thereafter, pan 35 can be readily attached to refrigerator cabinet 2 through a plurality of fasteners such as sheet metal screws 103 that extend through apertures 43 and 47 in each longitudinal end 40, 41 of pan 35 and into lower in-turned flanges 106 (see FIG. 6) formed as part of side panels 4 and 5 of refrigerator cabinet 2.

Based on the above description, it should be readily apparent that the present invention provides an efficient assembly method for attaching a compressor, a condenser and a fan unit to a refrigerator cabinet while providing an improved wheel mounting arrangement for the pan. More specifically, drawing the wheel wells from the plate that defines the pan, as well as forming lower recess portions which define enlarged bearing surfaces for axles associated with the wheels, provides an extremely improved wheel mounting arrangement for a refrigerator cabinet which is void of any of the disadvantages associated with the known prior art discussed above and therefore will have a characteristically long longevity and will not be the subject of undesirable repairs.

Although described with respect to a preferred embodiment of the invention, it should readily apparent that various changes and/or modifications may be made to the invention without departing from the spirit thereof. In general, the invention is only intended to be limited by the scope of the following claims.

What is claimed is:

1. A refrigerator compressor mounting pan arrangement comprising:

an elongated plate having first and second longitudinally spaced ends and upper and lower sides;

a plurality of longitudinally spaced bracket elements provided on the upper side of said plate for attaching at least a refrigerator compressor atop said plate;

at least one wheel well formed in said plate;

a pair of longitudinally spaced bearing surfaces formed in the lower side of said plate on opposing longitudinal sides of said wheel well;

a wheel positioned in said wheel well, said wheel having a central bore;

an axle extending through said bore, said axle having first and second end portions respectively positioned against said pair of longitudinally spaced bearing surfaces; and a pair of tabs projecting from said plate adjacent said pair of bearing surfaces, said tabs respectively extending about the first and second end portions of said axle to retain said wheel within said well.

2. The refrigerator compressor mounting pan arrangement according to claim 1, further comprising means, carried by said plate, for attaching said plate to a refrigerator cabinet.

3. The refrigerator compressor mounting pan arrangement according to claim 2, wherein said attaching means comprises a plurality of apertures formed in the first and second longitudinally spaced ends of the plate, at least one of the apertures in each of the first and second longitudinally spaced ends constituting a slot.

4. The refrigerator compressor mounting pan arrangement according to claim 1, wherein said at least one wheel well is drawn out of said plate and defines a generally convex surface portion on the upper side of said plate.

5. The refrigerator compressor mounting pan arrangement according to claim 4, wherein said pair of tabs are lanced out of said plate on longitudinally opposed sides of said well.

6. The refrigerator compressor mounting pan arrangement according to claim 1, wherein said bearing surfaces are defined by recessed pocket portions formed in the lower side of said plate on opposing longitudinal sides of said wheel well.

7. The refrigerator compressor mounting pan arrangement according to claim 1, wherein a pair of longitudinally spaced wheel wells are formed in said plate and a pair of wheels are provided, each of said wheels being received in a respective said wheel well.

8. The refrigerator compressor mounting pan arrangement according to claim 7, wherein said plurality of longitudinally spaced bracket elements comprises a first set of brackets substantially equally spaced from the first end of said plate, a second set of brackets substantially equally spaced longitudinally from said first set of brackets and at least one additional bracket element spaced from each of the first and second sets of bracket elements and the second end of said plate.

9. The refrigerator compressor mounting pan arrangement according to claim 8, wherein each of said bracket elements are lanced from said plate and project upwardly from the upper side of said plate.

10. The refrigerator compressor mounting pan arrangement according to claim 9, further comprising a compressor secured to said plate through said first and second sets of bracket elements.

11. The refrigerator compressor mounting pan arrangement according to claim 10, further comprising a condenser connecting to said plate through said third bracket element.

12. The refrigerator compressor mounting pan arrangement according to claim 11, further comprising a fan secured to said condenser and a plurality of fasteners for additionally interconnecting said condenser and fan to said plate.

13. A method of forming a refrigerator compressor mounting pan arrangement comprising:

providing an elongated metal plate having upper and lower surfaces;

forming a plurality of longitudinally spaced bracket elements out of said plate which project above said upper surface for mounting at least a refrigerator compressor atop said plate;

forming at least one wheel well in said plate with longitudinally spaced portions on the lower surface of said plate defining bearing surfaces at opposing sides of said wheel;

arranging a wheel, rotatably mounted upon an axle, in said wheel well with end portions of said axle being positioned against said bearing surfaces;

forming tabs out of said plate adjacent said bearing surfaces; and bending said tabs about said axle to retain said wheel within said wheel well.

14. The method of forming a refrigerator compressor mounting pan arrangement according to claim 13, further comprising forming said at least one wheel well by drawing said plate to form said wheel well.

15. The method of forming a refrigerator compressor mounting pan arrangement according to claim 14, further comprising forming a pair of longitudinally spaced wheel wells in said plate and arranging a wheel in each of said wheel wells.

16. The method of forming a refrigerator compressor mounting pan arrangement according to claim 13, further comprising forming said plurality of longitudinally spaced bracket elements by lancing a first set of bracket elements out of said plate at a position spaced from one end of said plate, lancing a second set of bracket elements out of said plate at a position longitudinally spaced from said first set of bracket elements and forming a third bracket element out of said plate at a position longitudinally spaced from each of said first and second sets of bracket elements and a second longitudinal end of said plate.

* * * * *